United States Patent [19]

Zelenak et al.

[11] Patent Number: 5,547,217

[45] Date of Patent: Aug. 20, 1996

[54] AIR BAG INFLATOR AND METHOD OF MANUFACTURE THEREOF

[75] Inventors: Daniel G. Zelenak, Orion Township; Rickey L. Stratton, Pontiac, both of Mich.

[73] Assignee: Automotive Systems Laboratory, Inc., Farmington Hills, Mich.

[21] Appl. No.: 498,886

[22] Filed: Jul. 6, 1995

[51] Int. Cl.⁶ .................................................. B60R 21/28
[52] U.S. Cl. ........................ 280/741; 280/736; 222/3; 102/530
[58] Field of Search ......................... 280/741, 736, 280/728.1, 743.1; 222/3, 5; 102/530, 531, 202, 202.14; 422/164

[56] References Cited

U.S. PATENT DOCUMENTS

| | | | |
|---|---|---|---|
| 4,817,828 | 4/1989 | Goetz | 222/3 |
| 4,878,690 | 11/1989 | Cunningham | 280/736 X |
| 4,944,527 | 7/1990 | Bishop et al. | 280/741 |
| 5,226,669 | 7/1993 | Honda | 222/3 X |
| 5,308,588 | 5/1994 | Emery et al. | 280/736 X |
| 5,346,252 | 9/1994 | Levosinski | 280/241 X |
| 5,447,105 | 9/1995 | Bauer et al. | 102/530 |

*Primary Examiner*—Christopher P. Ellis
*Attorney, Agent, or Firm*—Lyman R. Lyon

[57] ABSTRACT

An air bag inflator is manufactured by sandwiching a wire mesh filter between a pair of flat elongated perforate strips of steel, thereafter rolling the sandwiched steel strips and wire mesh concomitantly to form a right circular cylindrical tube with the edge portions of the steel strips orientated in juxtaposed relation to one another, respectively; and welding the juxtaposed edge portions of the strips by a common weld that extends radially across the edge portions of both of the steel strips.

4 Claims, 1 Drawing Sheet

U.S. Patent    Aug. 20, 1996    5,547,217
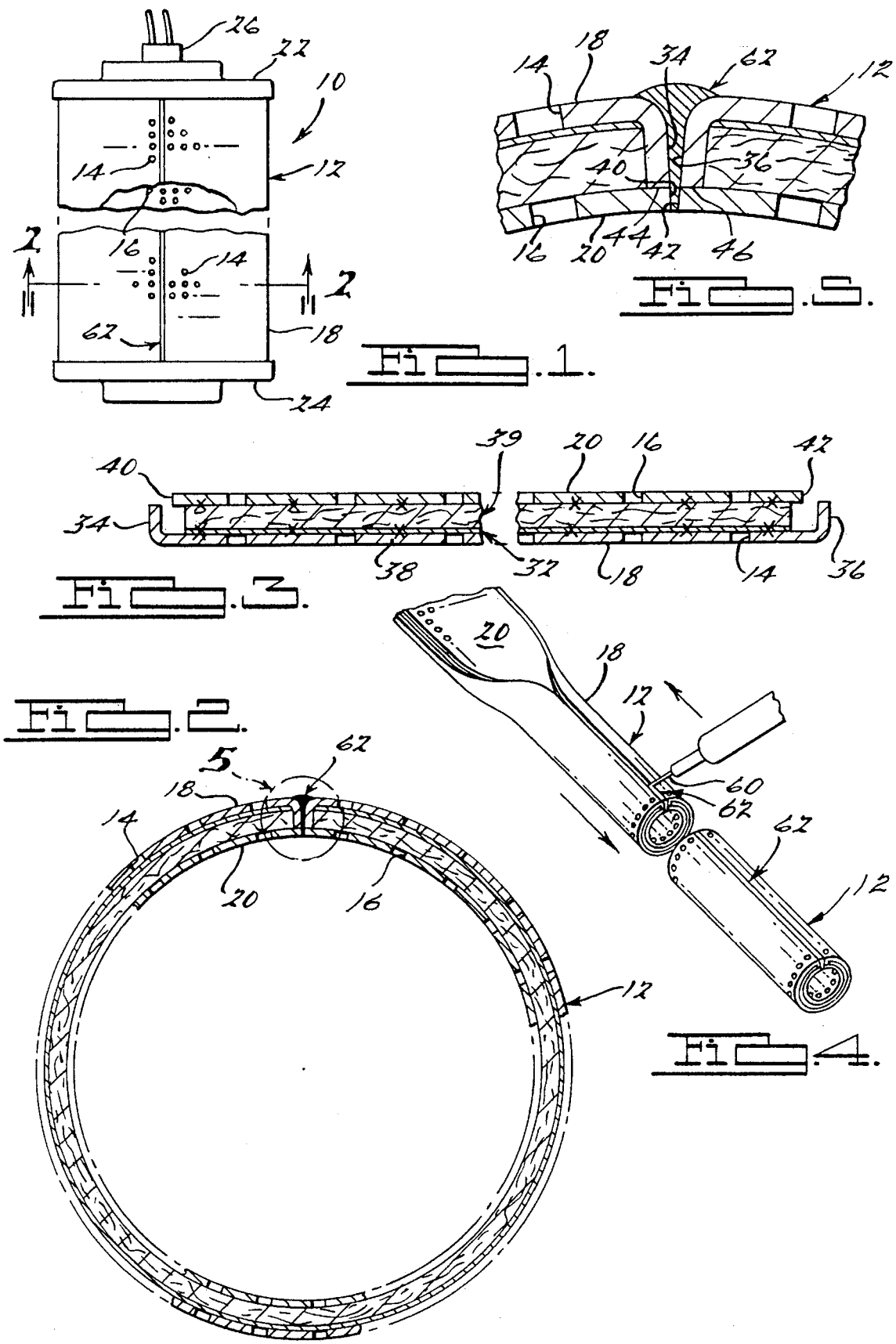

AIR BAG INFLATOR AND METHOD OF MANUFACTURE THEREOF

BACKGROUND OF THE INVENTION

Inflators for vehicle occupant restraint systems are required to meet strict structural and functional standards. Therefore, strict procedures and tolerances are imposed on the manufacturing process. While field experience indicates that the industry has been successful in meeting current structural and functional standards, the cost of manufacture of known inflators is excessive. Thus, there is a requirement for an inflator that meets existing standards but that can be manufactured in a more cost effective manner.

SUMMARY OF THE INVENTION

The aforesaid problem is solved, in accordance with a preferred constructed embodiment of the present invention, by forming a double walled cylindrical inflator housing by sandwiching a conventional wire mesh filter between two elongated strips of perforate steel and rolling the assembly to form a cylindrical inflator housing. More specifically, the longitudinal edges of a steel strip forming the outer wall of the double walled inflator housing are initially folded at right angles, respectively, relative to a center portion thereof. A wire mesh filter and second perforate steel strip are superimposed on the first steel strip and welded thereto. The sandwich is then rolled to form a tube after which juxtaposed longitudinal edges of both strips of steel forming the inner and outer walls of the tube are joined by a single weld.

BRIEF DESCRIPTION OF THE DRAWINGS

FIG. 1 is an elevational view of an automotive air bag inflator constructed in accordance with the instant invention;

FIG. 2 is a view taken along the line 2—2 of FIG. 1;

FIG. 3 is a view of the inflator of FIG. 2 showing the assembled components prior to rolling of the assembly;

FIG. 4 is a perspective view of the structure of FIG. 3 at a subsequent stage of manufacture; and FIG. 5 is a view taken within the circle 5 of FIG. 2.

DETAILED DESCRIPTION OF THE PREFERRED EMBODIMENT(S)

As seen in FIG. 1 of the drawings, an inflator 10 having particular utility for use in, for example, an inflatable automobile restraint system, comprises a cylindrical housing 12 having a plurality of gas discharge orifices 14 and 16 disposed in a radially outer wall 18 and a radially inner wall 20, thereof, respectively. The housing 12 has conventional end closures 22 and 24 at opposite ends thereof. The end closure 22 accepts a conventional igniter 26.

As best seen in FIGS. 3 and 5, and in accordance with one feature of the invention, opposite edge portions of the perforate steel strip 18, which forms the radially outer wall of the inflator 12, are folded at a right angle relative to a central portion 38 thereof to define flanges 34 and 36. Thereafter, the housing 12 of the inflator 10 is assembled in the flat by sandwiching and spot welding a filter 39, of conventional wire mesh construction, between the elongated steel strips 18 and 20. A frangible seal 32 of, for example, aluminum foil, may be interposed between the outer wall 18 and filter 39 of the housing 12 to hermetically seal the interior of the inflator 10 from the external environment.

After assembly of the aforesaid sandwich, the unitized strips 18 and 20 and filter 30 are fed through conventional rolls (not shown), to form a tube of right circular cylindrical configuration, (FIG. 4).

As seen in FIG. 2, 4 and 5, and in accordance with another feature of the invention, the opposed faces of the flanges 34 and 36 of the outer wall 18, as well as a pair of opposed-edge faces 40 and 42 of the perforate steel strip 20 defining the inner wall of the housing 12, are disposed in juxtaposed relation after rolling. Thereafter, a laser beam 60 is directed between the aforesaid juxtaposed faces on the flanges 34 and 36 of the strip 18 and edge portions 40 and 42 of the strip 20 so as to form a single weld 62 that extends radially across the juxtaposed flanges 34 and 36 of the outer wall 18 and also across the juxtaposed edge faces 40 and 42 of the inner wall 20 of the inflator housing 12. Thus, the single weld 62 joins the outer wall 18, and the inner wall 20 to one another forming the right circular cylindrical housing 12 in a manner that exhibits significant structural integrity. After the weld 62 is completed, the housing 12 is cut to length as dictated by the application. Thereafter, the end caps 22 and 24 are welded to the housing 12, the housing 12 is filled with propellant grains, and the igniter 26 installed.

It is to be noted that the radial dimension of the flanges 34 and 36 on the radially outer wall 18 defines the spacing of the outer wall 18 from the inner wall 20. Moreover, engagement of radially inner edge faces 44 and 46 on the flanges 34 and 36, respectively, with the inner wall 20 lends significant structural support to the inner wall 20 and positively positions the inner wall 20 relative to the outer wall 18.

While the preferred embodiment of the invention has been disclosed, it should be appreciated that the invention is susceptible of modification without departing from the scope of the following claims.

I claim:

1. A method of manufacturing an air bag inflator housing comprising the steps of:

provoking a first flat elongated strip of perforate metal of a first width and having opposite parallel longitudinally extending edge portions;

providing a second flat elongated strip of perforate metal of a second width greater than the width of said first strip;

folding opposite longitudinally extending edge portions of said second metal strip at a right angle relative to an intermediate portion thereof to define a pair of parallel longitudinally extending edge flanges;

providing an elongated strip of metal wire mesh having a width substantially equal to the width of said first perforate metal strip;

sandwiching said strip of wire mesh between said first and second perforate metal strips;

rolling said sandwiched perforate metal strips and wire mesh concomitantly to form a right circular cylindrical tube with the edge portions of said first strip and the flange portions of said second strip orientated in circumferentially juxtaposed relation to one another, respectively; and concomitantly welding the juxtaposed edge portions of said first and second strips by a common weld that extends radially across each of the flanges on said second strip and the edge portions of said first strip.

2. The method of manufacturing an inflator housing of claim 1 wherein the welding step includes:

welding said first and second perforate metal strips and said wire mesh to one another.

3. An air bag inflator comprising:

a first perforate right circular metal cylinder having a longitudinal slot therein;

a second perforate right circular metal cylinder of larger diameter than said first cylinder having a longitudinal slot therein telescoped thereabout in a concentric array;

a wire mesh filter disposed between said cylinders; and a single common longitudinally and radially extending weld closing each of the slots in said cylinders joining said cylinders to one another in said concentric array.

4. The inflator of claim 3 wherein the longitudinally extending edge portions of said radially outer cylinder have a pair of longitudinally and radially inwardly extending flanges, respectively, defining the longitudinal slot therein, said flanges extending radially inwardly into engagement with the inner cylinder to define a radial spacing therebetween.

* * * * *